INVENTORS
N. B. KARAU
R. STEPHENS
BY R. P. Miller
ATTORNEY

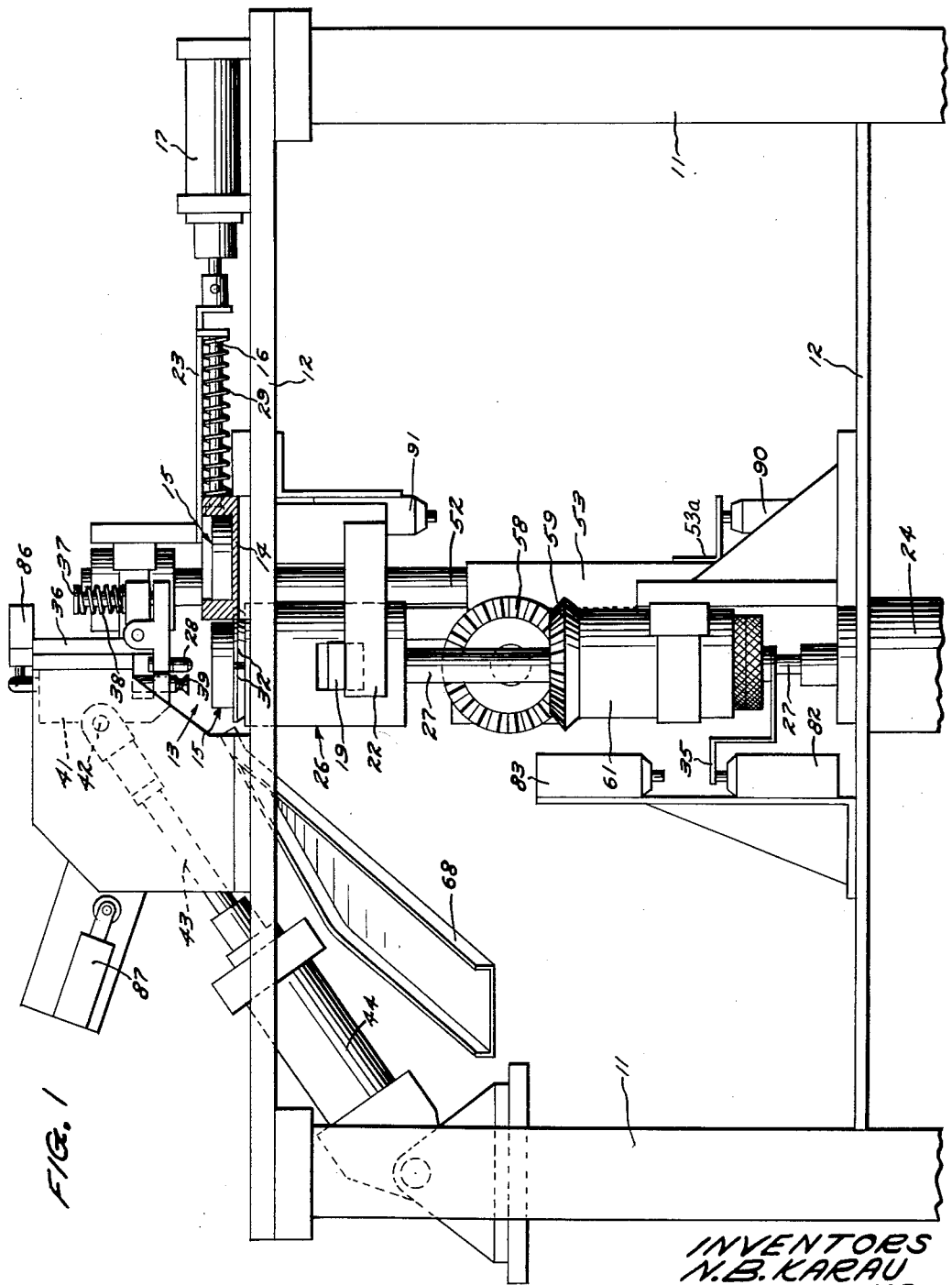

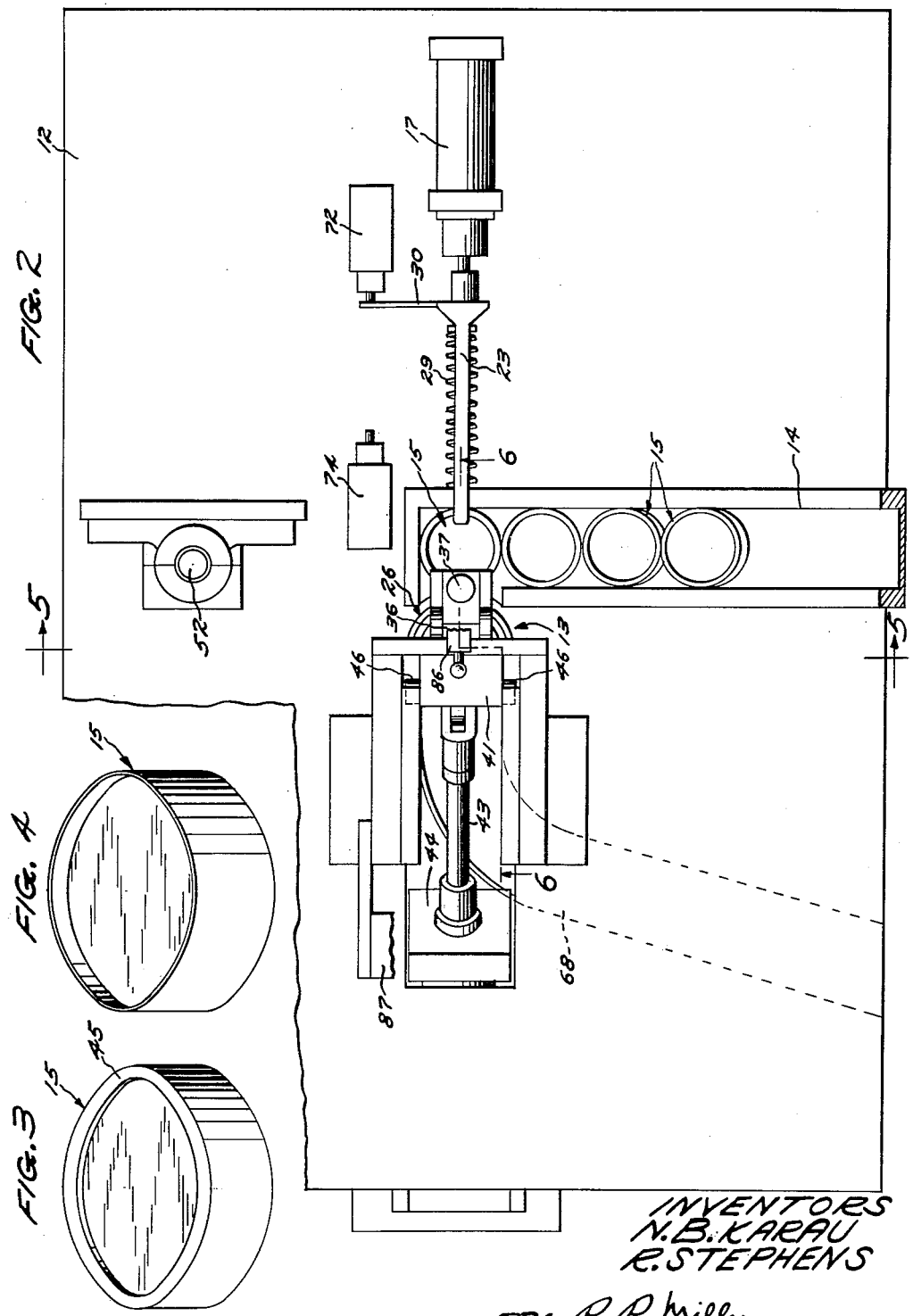

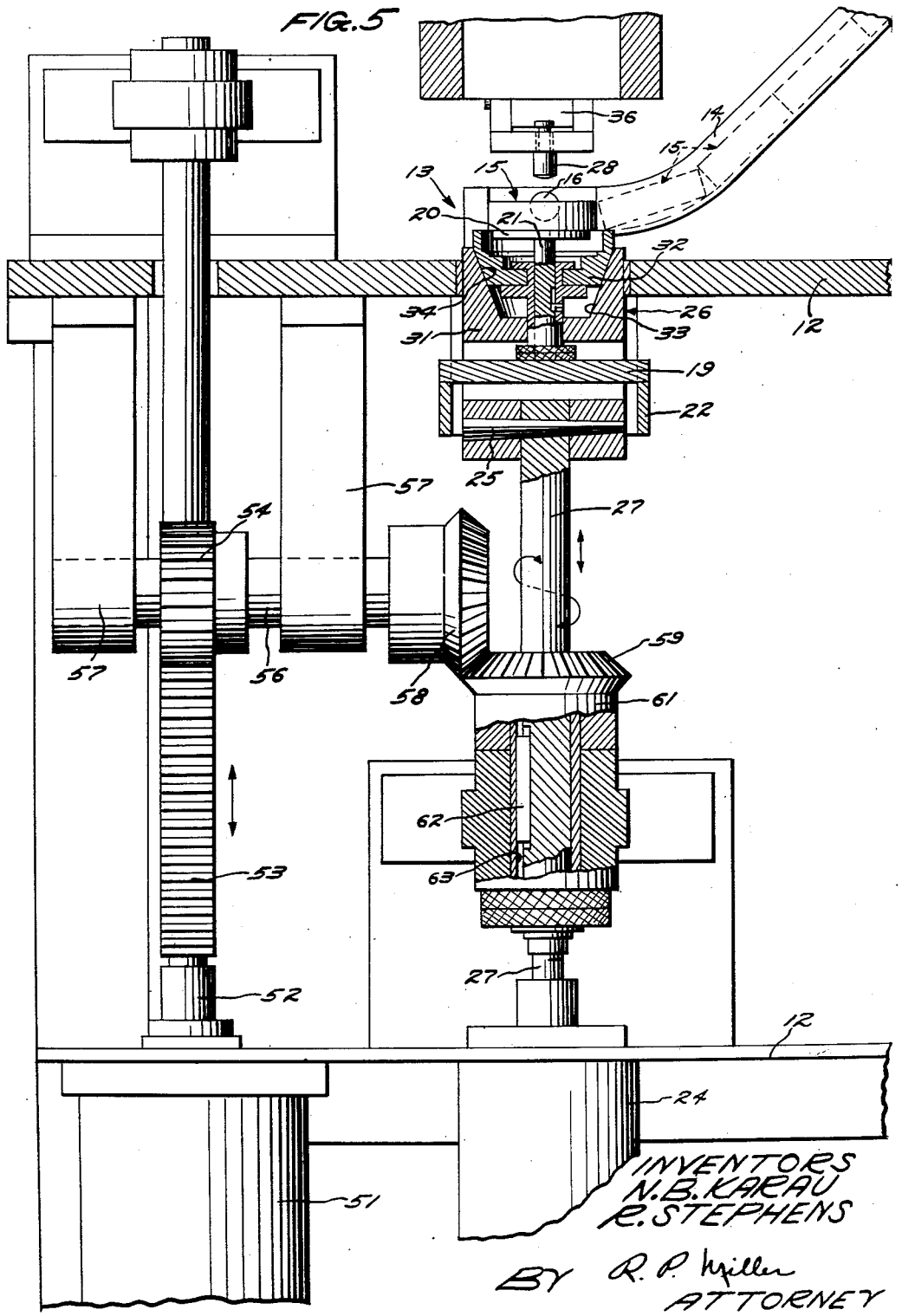

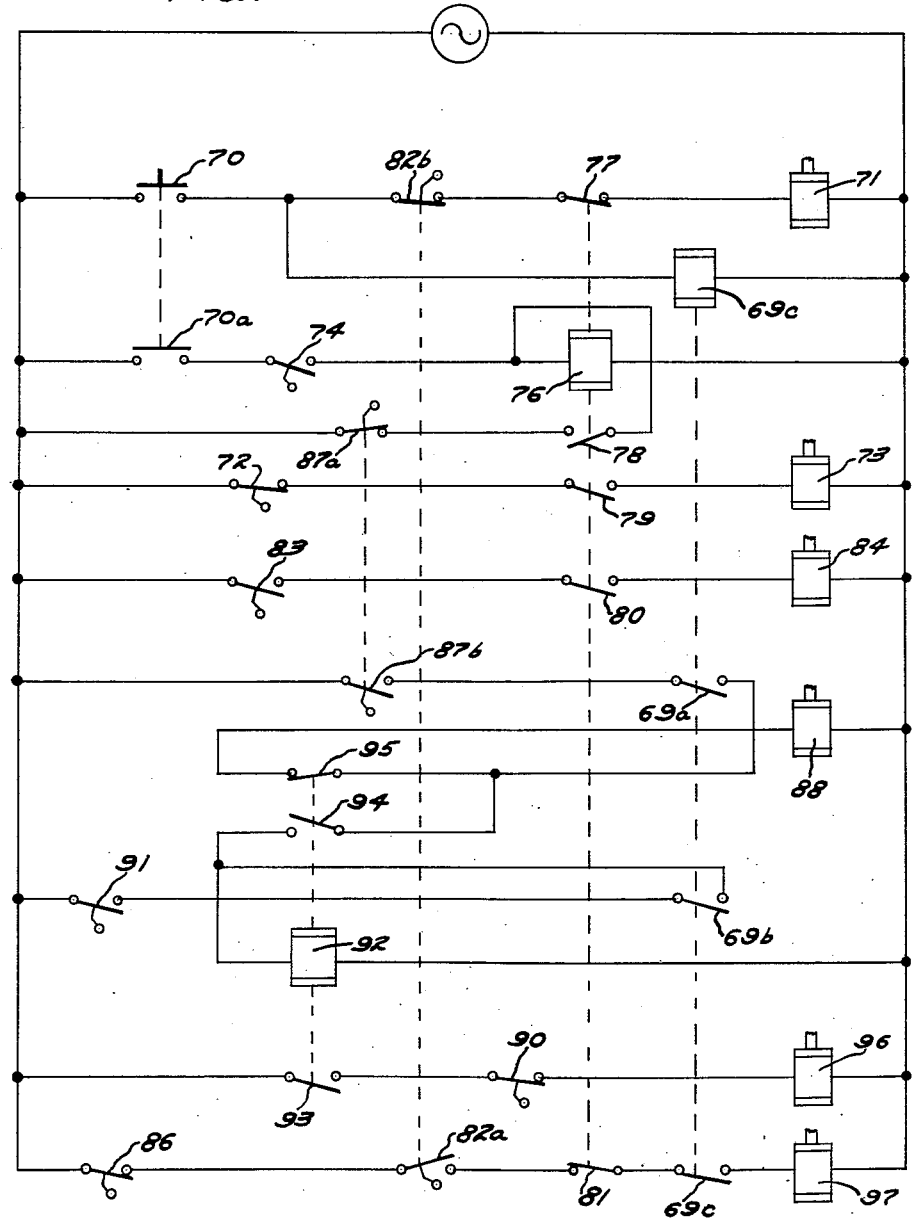

United States Patent Office 3,034,561
Patented May 15, 1962

3,034,561
APPARATUS FOR UNCRIMPING FERRULED
END PORTIONS OF ARTICLES
Norbert B. Karau and Roger Stephens, Indianapolis, Ind.,
assignors to Western Electric Company, Incorporated,
New York, N.Y., a corporation of New York
Filed Apr. 30, 1959, Ser. No. 810,056
6 Claims. (Cl. 153—32)

This invention relates to an apparatus for uncrimping ferruled end portions of articles and more particularly to an apparatus comprising an article-holding collet that advances a crimped article into alignment with an uncrimping tool that is laterally moved and pivoted to uncrimp a portion of the article whereafter the collet is rotated to effectuate a complete uncrimping of the article.

Numerous inventive efforts have been directed toward providing a simple positive-acting uncrimping device which operates automatically and is readily adaptable for use as an opener or the like for a variety of articles having ferruled or other similar crimped end portions. The majority of devices developed thus far have embodied such features as a manually-rotated uncrimping tool that is moved relative to a stationary article or a rotatable head having a plurality of tools mounted thereon that have surfaces beveled at varied angles in order that the uncrimping of a ferruled end portion be increased as the head is rotated relative to the article. However, it is highly desirable that an apparatus of this type by provided with means for automatically feeding articles to an uncrimping station, advancing the articles into alignment with the tool while simultaneously initiating a lateral movement of the tool into positive engagement with the ferruled portion of the article, maintaining the movement of the tool within a slotted support member to thoroughly uncrimp the engaged portion without tearing the ferrule, and initiating the rotation of the article relative to the tool to completely uncrimp the remaining portion of the ferrule.

It is a primary object of this invention to provide a new and improved apparatus for uncrimping ferruled end portions of articles.

Another object of this invention resides in a uniquely slotted uncrimping tool support member that provides surfaces to insure a lateral movement of the tool relative to a ferrule end portion of an article until the ferrule has been engaged and then transmits a camming or uncrimping action to the ferruled end portion by pivoting the tool relative to the article.

A further object of the invention is to provide automatic means for sequentially advancing articles to a holding collet whereupon facilities are actuated to cause the collet to grip the article and to advance the article into alignment with an uncrimping tool.

Still another object of the invention resides in rotating the collet having an article positioned therein so that an uncrimping tool which has been advanced into alignment with and has uncrimped a portion of the article lifts the remaining crimped portion of the ferrule from engagement with the article.

With these and other objects in view, the present invention contemplates an apparatus for uncrimping ferruled portions of articles which are successively advanced into an uncrimping station and thereafter gripped and permanently held by a holding collet. Subsequent to the advance of an article into a seated position within the collet, instrumentalities are rendered effective whereby the gripping collet and the article secured therein are advanced into alignment with an uncrimping tool. The advance of the collet and the article secured therein actuates a switch that initiates the operation of an uncrimping-tool advancing means. The advancing means imparts a motion to the tool which is positioned within a slotted support structure in such a manner than an initial lateral movement of the collet into engagement with the uncrimped flange is followed by a pivotal movement of the tool so that the engaged ferruled portion is completely uncrimped. The lateral and pivotal movement of the uncrimping tool results in the actuation of a rack and pinion arrangement whereby the gripping collet and the article securely positioned therein are rotated relative to the uncrimping tool to complete the uncrimping operation. Following this, the uncrimping tool is returned to a former position, the collet is retracted, and another article is advanced to the uncrimping station, thereby ejecting the article previously positioned therein.

Other objects and advantages of the present invention will become apparent from the following detailed description when considered in conjunction with the following drawings wherein:

FIG. 1 is a front elevational view of an apparatus for uncrimping ferruled end portions of articles embodying the principles of the present invention;

FIG. 2 is a plan view of the same apparatus illustrating a feeder of the pusher type for successively advancing articles to an uncrimping station;

FIG. 3 is a perspective view showing an article having a ferruled end portion;

FIG. 4 is a perspective view of the same article after the ferruled end portion has been uncrimped by the apparatus shown in the other figures;

FIG. 5 is an enlarged fragmentary side view partially in section taken along the line 5—5 of FIG. 2;

FIG. 10 is a schematic view of the control circuit for the apparatus shown in the other figures.

Figure 6:
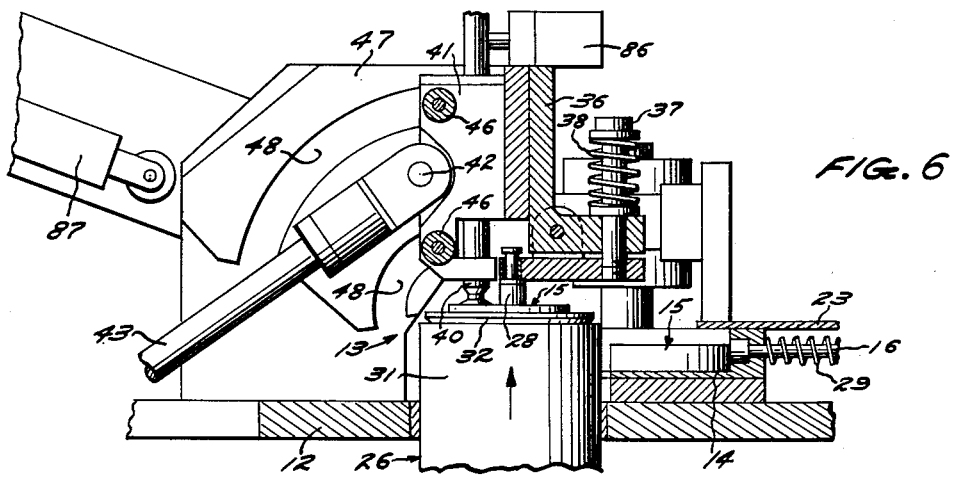
FIG. 6 is an enlarged fragmentary front view taken along the line 6—6 of FIG. 2 illustrating a crimping tool in an unoperated position.

Referring to the drawings and more particularly to FIGS. 1, 2 and 5, there is disclosed a support structure comprising a plurality of legs 11 to which are secured a pair of support plates 12. An uncrimping station generally designated by the numeral 13 is positioned at the base of a gravity chute 14 to receive articles 15 delivered thereto by means of a pusher 16 under the control of an air cylinder 17.

An article 15 that has been advanced into the uncrimping station 13 by means of the pusher and air cylinder device is seated upon a support plate 20 which is in turn mounted on a rod 21 secured to a movable bar 19. The unrestricted advance of an article under the control of the pusher and cylinder arrangement is enhanced by a movable guide bar 23 that functions to preclude any upward movement of the article 15 as the pusher seats the article upon the support plate 20.

Subsequent to the positioning of an article within the uncrimping station, a cylinder 24 is rendered effective to advance a holding collet, generally designated by the numeral 26, upwardly into positive engagement with the article 15 positioned upon the plate 20. This upward movement is transmitted to the collet 26 through a piston rod 27 and the engagement of the article results from the cooperation of the upwardly advancing collet with a resiliently mounted stop pin 28 that is positioned above and in alignment with the center of the article 15. More particularly, the gripping or engaging action is accomplished by the movement of a chuck 31 relative to a plurality of jaw sections 32, the advance of which is precluded due to the action of the stop pin 28 upon the article which is seated within the jaws. Angularly disposed surfaces 33 of the chuck 31 engage similarly contoured surfaces 34 of the jaw sections 32 to cam the jaw into positive engagement with the stationarily positioned article 15.

Figure 7:
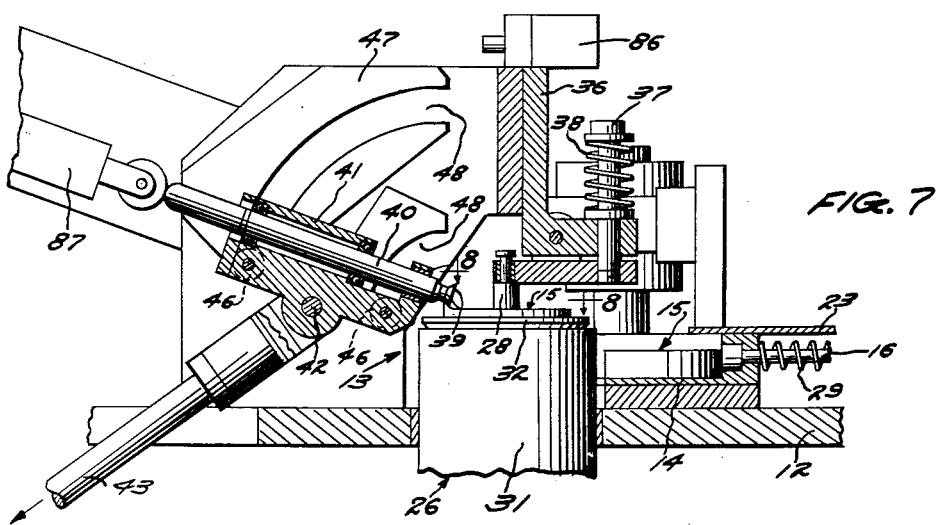
FIG. 7 is a fragmentary side view similar to FIG. 6 but illustrating the uncrimping tool in the operative position.

The stop pin 28, that is utilized to preclude the upward advance of the article and provide an abutting means whereby the jaws 32 of the collet 26 are cammed into positive engagement with the article 15 due to the relative movement of the chuck 31 thereto, is resiliently secured to a bar or support plate 36 (see FIGS. 6 and 7). The support plate 36 is, in turn, bored to accommodate a pin 37 to which a spring 38, that provides the aforementioned resilient action, is secured. The resilient action of the stop pin 28 subsequent to being engaged by an article 15 securely positioned in the upwardly advancing collet allows the crimped or ferruled portion of the article to be brought into lateral alignment with an uncrimping tool generally designated by the numeral 40 that is rotatably mounted within a movable housing 41. The uncrimping tool 40 is provided with a flared or frustoconical uncrimping surface 39 that functions to preclude the rupture of the engaged end portion of an article while accomplishing an uncrimping operation thereon. The housing 41 is secured by a pin 42 to a piston arm or shaft 43 under the control of a cylinder 44. The cylinder 44 is in turn, securely mounted between a pair of legs 11.

Figure 8:
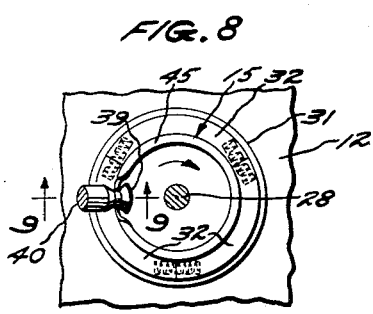
FIG. 8 is a fragmentary plan view along the line 8—8 of FIG. 7.
Figure 9:
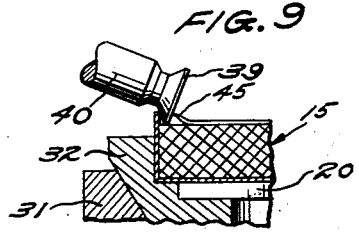
FIG. 9 is an enlarged fragmentary sectional view taken along the line 9—9 of FIG. 8.

As best illustrated by FIGS. 6 and 7, the uncrimping tool, under the action of the cylinder 44, is initially advanced into lateral engagement with the crimped or ferruled end portion 45 of the article 15. The initial lateral movement of the tool results from the travel of a pair of rollers 46 through a support plate 47 having a plurality of guideways comprising cam channels or guide surfaces 48. The movement of the rollers 46, which are secured to the housing 41, through the substantially horizontal portion of the channels 48 to accomplish the lateral movement of the tool is followed by a pivotal movement of the tool 40 resulting frpm the travel of the housing rollers 46 over the curved portions of the channels within the support plate. The pivotal movement of the tool subsequent to the engagement of the ferruled end portion results in an uncrimping of the contacted area as best illustrated by FIGS. 8 and 9.

The aforementioned initial uncrimping operation resulting from the engagement of the article by the tool 40 is followed by a rotation of the collet 26, within which the article is secured, through 360°. The rotation of the article relative to the stationary tool that is maintained in a pivoted position is accomplished by the actuation of an air cylinder 51 and a resulting upward movement of a piston rod 52 to which is secured a rack 53 that engages and drives a pinion 54. The movement of the rack and pinion arrangement is transmitted through a shaft 56 supported within a bushing 57 to a pair of bevel gears 58 and 59. The rotation imparted to the gear 59 that forms a portion of the housing 61 is transmitted to the shaft 27 by means of a key 62 positioned within a keyway 63 formed in the shaft. The shaft 27 that is secured to the collet 26 by a pin 25 rotates the collet relative to the pivoted tool to accomplish the remaining uncrimping operation.

Subsequent to the complete rotation of a collet and article through 360°, the piston rod 52 is retracted due to a spring action within the cylinder 51 thereby transmitting a counter rotation to the collet through the previously described members to return the collet to an initial position. Following this, the air cylinder 17 is again actuated to eject the uncrimped article into an exit chute 68 while simultaneously feeding another article having a ferruled end portion into the uncrimping station 13.

Mode of Operation

The overall operation of the device may best be appreciated by reference to FIG. 10. The uncrimping apparatus is conditioned for operation by a depression of an auto-cycle on-off switch 70 that closes contacts 70a. With the auto-cycle switch on, a feed solenoid 71 is energized, and a path for energizing current is provided for a relay 69. The energization of the feed solenoid 71 results in the actuation of the air cylinder 17 to advance an article 15 into the uncrimping station. Relay 69 upon being energized draws up contacts 69a, 69b and 69c.

The actuation of the feed means advances the guide bar 23, thereby removing a member 30 projecting therefrom from engagement with a switch 72. The removal of the projecting member 30 from contact with the switch 72 results in the opening of the energizing circuit for a clamp-up solenoid 73 which controls the operation of the air cylinder 24. Near the end of the advance stroke of the pusher 16 and the movable guide bar 23, the projecting member 30 contacts a switch 74, thereby energizing a clamping relay 76 to draw up contacts 77, 78, 79, 80 and 81. The drawing up of contacts 77 results in the opening of the energizing circuit for the feed solenoid 71 and the retraction of the pusher 16 and the guide bar 23 due to the resilient action of the spring 29. On retraction, the projecting member 30 engages and once again closes the switch 72 thereby completing an energizing circuit for the clamp-up solenoid 73 that may be traced through the switch 72 and the contacts 79 of the relay 76.

The energization of the clamp-up solenoid 73 results in the actuation of the air cylinder 24 and in the upward advance of the piston rod 27 to which is secured a projecting member 35. The upward movement of the member 35 results in the disengagement of a limit switch 82, thereby closing contacts 82a and opening contacts 82b. Near the end of the advance stroke, a limit switch 83 is engaged and closed, thereby completing a path for energizing current through the now closed contact 80 to a tool-positioning solenoid 84. The energization of the solenoid 84 causes the air cylinder 44 to be rendered effective and initiates the lateral advance of the tool 40 into positive engagement with the flange or ferruled end portion 45 of the article 15. Further retraction of the shaft or piston rod 43 within the cylinder 44 results in the pivotal movement of the tool to accomplish an uncrimping operation on the engaged portion of the ferrule.

The sequential lateral and pivotal movements of the tool relative to the positioned article 15 result in the disengagement of the uppermost portion of the tool from a switch 86. Near the end of the retraction stroke, the tool engages a limit switch 87, thereby opening contacts 87a while closing contacts 87b. The opening of the contacts 87a results in the deenergization of the clamping relay 76 and the closure of contacts 87b results in the energization of a rotational solenoid 88. The energized rotational solenoid 88 actuates the air cylinder 51, thereby rendering the rack and pinion mechanism effective. As the rack 53 advances, a projecting member 53a is removed from engagement with the switch 90 and near the top of the upward stroke, the projecting member is moved into engagement with a switch 91. The closure of the switch 91 completes a path for energizing current to a tool-positioning relay 92 that may be traced through the switch 91 and contacts 69b of the cycle relay 69.

The energization of the tool-positioning relay 92 results in the closure of contacts 93 and 94 and opens contacts 95, thereby deenergizing the rotational solenoid 88 and causing the retraction of the piston rod 52. This retraction of the piston rod due to a spring action within the cylinder 51 rotates the collet within which the article is secured to a former position and again brings the projecting member 53a into engagement with the switch 90.

The closure of the switch 90 completes a path for energizing current to a tool-repositioning solenoid 96 previously conditioned for energization by the closure of contacts 93. The energization of the tool-repositioning solenoid once again actuates the cylinder 44 to return to the tool 40 to an initial position with the uppermost portion thereof engaging the switch 86. The disengagement of the tool 40 from the switch 87 results in the deenergization of the tool-positioning relay 92. The closure of the switch 86 completes a path for current whereby a clamp-return solenoid 97 is energized. This path for energizing current may be traced through the contacts 82a, the contacts 69c, the switch 86 and the contacts 81 to the solenoid 97. The energization of the clamp-return solenoid effects the actuation of the air cylinder 24 to retract the collet and bring the projecting member 35 back into engagement with the switch 82, thereby deenergizing the clamp-return solenoid and energizing the feed solenoid to initiate another cycle of operation.

It is to be understood that the above-described arrangements are simply illustrative of the application of this invention. Numerous other arrangements may be readily devised by those skilled in the art which will embody the principles of the invention and fall within the spirit and scope thereof.

What is claimed is:

1. In an uncrimping machine, an article-holding collet, means for advancing an article having a crimped portion into said collet, an uncrimping tool positioned in vertical alignment with said article and said collet, means rendered effective by said article-advancing means for imparting movement to said collet relative to said uncrimping tool to position the crimped portion of said article in lateral alignment with said tool, means actuated by said positioning means for advancing said tool into engagement with said article to uncrimp one section thereof, and means rendered operable by said tool-advancing means for rotating said collet relative to said uncrimping tool to complete said uncrimping operation.

2. Uncrimping apparatus comprising an article seating fixture, a tool housing, a tool rotatably mounted within said housing and having an uncrimping edge at one extremity thereof, means for seating an article having a crimped end portion within said fixture and for imparting movement to said fixture to bring the plane of the crimped end portion of said article to said one extremity of said tool, a support frame, means for imparting movement to said housing relative to said support frame, and guide means connecting said housing and said support frame so that the advance of said housing relative to said support frame results in the uncrimping edge of said tool being brought into engagement with a section of the crimped end portion of said article to effect the uncrimping thereof.

3. Apparatus for uncrimping ferruled end portions of articles which comprises support means having guideways formed therein, each of said guideways having a straight section communicating with a curved section; a carriage having guide rollers projecting therefrom, said guide rollers being mounted for movement within said guideways; an uncrimping tool mounted within said carriage; an article-holding collet movably mounted in alignment with said uncrimping tool; means for advancing an article having a ferruled end portion into a seated position within said collet; means for imparting movement to said carriage and for moving said rollers sequentially through said straight and curved sections of said guideways so that said tool is advanced into positive engagement with a section of the ferruled end portion of the article and thereafter pivoted to uncrimp the engaged section; and means actuated by said uncrimping tool subsequent to the uncrimping of the engaged section of the article for rotating said collet to uncrimp the remaining portion of said article.

4. An uncrimping apparatus which comprises a pair of support plates mounted in parallel arrangement, each of said support plates being slotted to provide a pair of guideways having a horizontal section communicating with a curved section; a tool carrier having roller members projecting therefrom, said roller members being mounted for movement within said guideways and normally positioned within the horizontal section thereof; an uncrimping tool mounted within said carrier for movement therewith; an article-holding collet positioned in vertical alignment with said uncrimping tool; means for advancing an article into a seated position within said holding collet; means actuated by said advancing means for imparting vertical movement to said article-holding collet to bring a portion of said article into engagement with said uncrimping tool; and means rendered effective by said last mentioned means for imparting movement to said carrier and for sequentially advancing said rollers through the horizontal section of each of said guideways to bring said uncrimping tool into engagement with a section of the crimped end portion of said article and through the curved section of said guideways to pivot said tool and uncrimp the engaged section.

5. Apparatus for uncrimping a ferruled casing that surrounds substantially cylindrical articles and extends over the edge of the upper surface thereof; which apparatus comprises a support plate having cam channels formed therein, each of said cam channels having a straight section communicating with an arcuate section; a housing having roller members projecting therefrom, said roller members being mounted for movement within said cam channels and normally positioned within the straight sections thereof; an uncrimping tool rotatably mounted within said housing, said uncrimping tool having a conical uncrimping surface; an article-holding collet positioned in alignment with said uncrimping tool when said roller members of said housing are positioned within the straight section of each of said cam channels; means for advancing an article into a seated position within said holding collet; means actuated by said article-advancing means for imparting movement to said holding collet to bring a portion of said article into engagement with the base of the conical uncrimping surface of said uncrimping tool; means rendered effective by said collet moving means for imparting motion to said housing whereby said rollers are sequentially advanced through the straight and arcuate sections of each of said cam channels and said tool is moved relative to said seated article so that the conical uncrimping surface thereof engages and is moved beneath the ferruled casing extending over the edge of said article to uncrimp the engaged section thereof; and means rendered effective by said last mentioned means for rotating said collet relative to said tool and said uncrimping surface thereof to complete an uncrimping operation.

6. In a machine for automatically uncrimping a crimped edge of a cylindrical container, a container seating fixture, an uncrimping tool having an edge for insertion under the crimped edge of said container, means supporting said fixture and said tool for movement relative to each other, means for causing relative movement of said tool edge under said crimped edge of a container seated in said fixture to uncrimp partially the portion of the crimped edge engaged by said tool edge, means for pivoting said tool about said tool edge to bring the engaged portion of the crimped edge to fully uncrimped condition, and means for producing relative rotation of said tool edge and said container about the axis of said cylindrical container, with said tool thus pivoted, to bring the remaining portion of the crimped edge to fully uncrimped condition.

References Cited in the file of this patent

UNITED STATES PATENTS

| | | |
|---|---|---|
| 912,377 | Hutchinson | Feb. 16, 1909 |
| 1,276,267 | Rasmussen et al. | Aug. 20, 1918 |
| 2,028,202 | Gauthier | Jan. 21, 1936 |
| 2,334,407 | Grebe | Nov. 16, 1943 |
| 2,660,930 | De Vlieg et al. | Dec. 1, 1953 |